Patented Nov. 10, 1942

2,301,402

UNITED STATES PATENT OFFICE 2,301,402

REFRACTORY PROCESS AND PRODUCT

Russell Pearce Heuer, Villa Nova, Pa., assignor to General Refractories Company, a corporation of Pennsylvania No Drawing. Application June 27, 1941,
Serial No. 400,121

24 Claims. (Cl. 106—59)

The present invention relates to non-acid refractory bricks which are chiefly composed of calcined magnesia, chrome ore, or a mixture of calcined magnesia and chrome ore in which one or the other predominates.

A purpose of the invention is to increase the crushing strength of non-acid refractory bricks at intermediate temperatures.

A further purpose is to incorporate one of the class which consists of pyrophyllite, sericite and mixtures of the two in non-acid refractory bricks.

A further purpose is to include in non-acid refractory bricks a mixture of pyrophyllite and/or sericite with kaolin.

A further purpose is to add from 1 to 10% or more of pyrophyllite and/or sericite and preferably also from 1 to 5% of kaolin to a non-acid refractory brick mix.

Further purposes appear in the specification and in the claims.

Non-acid refractory bricks have been employed widely in metallurgical furnaces and industrial furnaces such as open hearth furnaces for making steel, copper smelting and refining furnaces, lead furnaces, and glass tanks and furnaces. Non-acid refractory bricks are ordinarily made from calcined magnesia or periclase (frequently called dead burned magnesite), from chromite (chrome ore), or from mixtures of calcined magnesia and chromite in any desired proportions. The usual procedure in making such bricks is to grind the raw materials, grade them as to size, mix them in the desired proportions with due attention to particle size, incorporate water and binder, form the mix into brick under pressure, and either dry the brick without kiln firing to develop the bond, or fire in a ceramic kiln to a temperature of perhaps 1500° C. or higher.

In recent prior art practice difficulty has been encountered because the non-acid refractory bricks under discussion, while capable of developing fairly high crushing strengths at room temperature and reasonably satisfactory crushing strengths at high temperature (for example, 1400° C.), exhibit disproportionately low crushing strengths at intermediate temperature, for example 1200° C.

The low intermediate temperature crushing strengths which have been commonly exhibited by non-acid refractory bricks of the prior art cause two difficulties. In the first place, there are certain uses which normally subject the bricks to intermediate temperatures at the hot face. In the second place, in every high temperature installation there is a zone in the refractory wall between the hot and cold face which is at an intermediate temperature, and if the crushing strength of the brick is low at that intermediate temperature, this portion of the brick will form a zone of weakness.

The present inventor has discovered that the intermediate temperature crushing strength of non-acid refractory brick produced from one of the class which consists of calcined magnesia, chromite, and mixtures of the two, can be markedly increased, to produce a brick suitable for installations operating at intermediate temperature, and also free from any intermediate temperature zone of weakness when operating at high temperature. In the case of chrome brick, a step has previously been made toward improving the intermediate temperature crushing strength by adding kaolin to the brick.

The present inventor has discovered that markedly increased intermediate temperature crushing strengths can be obtained in non-acid refractory brick by the addition of pyrophyllite and/or sericite alone and preferably with kaolin.

Pyrophyllite is a natural hydrous silicate of alumina having the formula $Al_2O_3 \cdot 4SiO_2 \cdot H_2O$, with a theoretical composition of 28.3% $Al_2O_3$, 66.7% $SiO_2$, and 5% $H_2O$. Pyrophyllite is very commonly associated with sericite in commercial pyrophyllite deposits. Sericite is similar in composition and physical properties to pyrophyllite except that sericite contains more alumina and less silica, and has an appreciable alkali content. For the purposes of the present invention pure pyrophyllite, pure sericite, or mixtures of the two in any proportions, such as commercial pyrophyllite containing any quantity of sericite which may be present, can be used with success.

Commercial pyrophyllite deposits range in composition as follows:

| | Per cent |
|---|---|
| $SiO_2$ | 57.5 to 88 |
| $Al_2O_3$ | 9 to 33 |
| $H_2O$ | 1 to 5.6 |

Commercial pyrophyllite frequently contains silica as an impurity. The following are analyses of pyrophyllite and sericite as obtained from natural deposits in North Carolina:

| | Pyrophyllite | Sericite |
|---|---|---|
| | Percent | Percent |
| Ignition loss | 3.1 | 5.1 |
| $SiO_2$ | 77.7 | 47.1 |
| $Fe_2O_3$ | 0.5 | 0.4 |
| $Al_2O_3$ | 18.3 | 36.9 |
| $TiO_2$ | 0.3 | 0.2 |
| CaO | 0.1 | 0.6 |
| MgO | 0.1 | 0.6 |
| Alkalies | Nil | 9.6 |
| | 100.1 | 100.5 |

Pyrophyllite is something known as pencil stone, agalmatolite, or pogodite. The two latter names are also applied to other materials which are not pyrophyllite.

Pyrophyllite exists in foliated and massive forms and either may be employed in the present invention, although it will be evident that the material should be reduced to a state of fine division, suitably below 50 Tyler standard mesh per linear inch, prior to use. One form is soft and flaky, while the other is slightly harder and less flaky.

The advantage of using pyrophyllite and/or sericite alone or combined with kaolin in a non-acid refractory brick for the purpose of increasing the intermediate temperature crushing strength exists in the case of chrome brick and chrome magnesia brick (predominantly chrome), but is especially pronounced in the case of magnesia brick and magnesia chrome brick (predominantly dead burned magnesite). With chrome brick and chrome magnesia brick, due to the large quantity of chromite, kaolin alone will produce a fairly satisfactory intermediate temperature crushing strength. Such is not, however, the case with magnesia brick and magnesia chrome brick where pyrophyllite and/or sericite alone or with kaolin are very desirable to increase the intermediate temperature crushing strength.

The quantity of pyrophyllite and/or sericite added will vary with the requirements of the particular brick. For ordinary purposes it is preferable to employ from 1 to 10% of pyrophyllite and/or sericite alone, or with kaolin. If a mixture of pyrophyllite and sericite be used, the total content of the two will preferably not exceed 10%. If there is no particular advantage in containing a low silica content, the quantity of pyrophyllite and/or sericite alone or in combination with kaolin may be increased beyond 10% for special purposes.

In case pyrophyllite and/or sericite is employed with kaolin, the kaolin content may range between 1 and 5%. If the kaolin content be increased beyond 5%, it is difficult to mold the brick under the high pressures normally used.

One of the important advantages of adding pyrophyllite and/or sericite is that comparatively large quantities of pyrophyllite and/or sericite can be tolerated in the mix without causing difficulties in molding such as lamination. Due to the large quantities of pyrophyllite and/or sericite and also to the inherent virtues of pyrophyllite and/or sericite, the intermediate temperature crushing strength can thus be increased by pyrophyllite and/or sericite without seriously complicating the molding procedure. Additions of such large quantities of kaolin, on the other hand, would not be feasible due to the trouble caused by kaolin in molding.

In many cases it is preferable to employ 5% of pyrophyllite and/or sericite and 3% of kaolin in non-acid bricks, although the pyrophyllite and/or sericite with kaolin may be in any desired proportions within the ranges as given above.

In the following examples, the commercial pyrophyllite referred to is a mixture of pyrophyllite with a lesser amount of sericite, the quantity of sericite being perhaps a quarter of the quantity of pyrophyllite.

In the following examples, the behavior of a chrome magnesia brick high in chrome is indicative of the behavior of a chrome brick, and the behavior of a magnesia chrome brick high in magnesia is indicative of the behavior of a magnesia brick, although generally somewhat better results are obtained from bricks made from mixtures of chrome and magnesia than from chrome bricks or magnesia bricks.

In all of the bricks in accordance with the present invention, the predominant constituent (more than 50%) and preferably more than 85% of the brick will be calcined magnesia, chromite, or a mixture of the two.

To a chrome magnesia brick mix consisting of 75% of chrome ore and 25% of calcined magnesia, 4% of commercial pyrophyllite based on the dry weight of the chrome magnesia mix was added with a sulphuric acid bond as later explained. This brick after drying to develop the bond showed an average cold crushing strength of 5950 pounds per square inch. After heating to 1200° C. for twenty-four hours this brick showed an average intermediate temperature crushing strength of 3210 pounds per square inch. A brick exactly identical with the one just discussed, except that it contained 4% of kaolin instead of 4% of commercial pyrophyllite, showed a higher cold crushing strength (8750 pounds per square inch) but a slightly lower crushing strength at intermediate temperature after heating to 1200° C. for twenty-four hours, the latter value being 3200 pounds per square inch. The brick containing pyrophyllite was easier to mold than the brick containing kaolin.

To a magnesia chrome brick mix consisting of 75% of calcined magnesia and 25% of chrome ore, 4% of commercial pyrophyllite based on the dry weight of the magnesia chrome mix was added with a sulphuric acid bond as later explained. After drying to develop the bond, this brick showed an average cold crushing strength of 6960 pounds per square inch. After heating to 1200° C. for twenty-four hours this brick had an average intermediate temperature crushing strength of 2470 pounds per square inch. A brick exactly identical with the one just discussed, except that it contained 4% of kaolin instead of 4% of commercial pyrophyllite, had a cold crushing strength of 10180 pounds per square inch (somewhat higher), but its intermediate temperature crushing strength after heating to 1200° C. for twenty-four hours was only 1940 pounds per square inch (about 20% lower).

Considerably better intermediate temperature crushing strengths are obtained by a mixture of kaolin and commercial pyrophyllite (or pyrophyllite or sericite) than from kaolin alone. A brick consisting of 75% of calcined magnesia and 25% of chrome ore, in which is incorporated 5% of commercial pyrophyllite and 3% of kaolin, based on the dry weight of the magnesite plus chrome, showed an average cold crushing strength of 7850 pounds per square inch and an average intermediate temperature crushing strength, after heating to 1200° C. for twenty-four hours, of 4080 pounds per square inch. It will be remembered that a similar brick containing 4% of kaolin but without the commercial pyrophyllite had an intermediate temperature crushing strength after heating for twenty-four hours to 1200° C. of 1940 pounds, or only about 50% as great; while one containing 4% commercial pyrophyllite without kaolin had an intermediate temperature crushing strength after heating to 1200° C. for twenty-four hours of 2470, or about 70% as great.

Thus, it is evident from the above example that in a magnesia chrome brick the presence of commercial pyrophyllite with kaolin more than doubles the intermediate temperature crushing strength as compared with a similar brick containing kaolin alone.

In a chrome magnesia brick the effect of commercial pyrophyllite with kaolin is not quite so spectacular as in a magnesia chrome brick, but the advantage is substantial.

In making up a brick according to the present invention, it is preferable to employ two sizes of particles, the larger being ground to pass a screen having six Tyler standard mesh per linear inch, the wire diameter being 0.036 inch.

The smaller particles are desirably ground to pass a screen having a hundred Tyler standard mesh per linear inch and wire diameter of 0.0042 inch. Fine grinding is desirable since it aids in increasing the strength of the finished brick.

For best results there will be about 25% of calcined magnesia in the form of fine particles employed in the chrome magnesite brick, and there will be about 25% of chrome usually in the form of fine particles employed in the magnesite chrome brick.

The fine particles will desirably range from 25 to 50% or more of the finished mix.

The principles of grain sizing and combining and the proportions outlined in my United States Patents 1,851,181; 1,845,968; 1,992,482; 1,992,483; and 2,087,107 may be employed in the present invention.

As a bonding material the pyrophyllite and/or sericite or pyrophyllite and/or sericite with kaolin will be added, preferably ground to pass a screen having two hundred Tyler standard mesh per linear inch and wire diameter of 0.002 inch. The pyrophyllite and/or sericite with or without kaolin in the proportions mentioned above, based upon the total weight of the chrome, magnesia, or the chrome and magnesia, will preferably be incorporated into the refractory material on a wet pan. An aqueous solution of sulphuric acid will very desirably be incorporated in the wet pan to aid in colloidal distribution of the pyrophyllite and/or sericite with or without kaolin over the particles of magnesia and/or chrome. Preferably about 3% of water may be employed on the wet pan. The strength of the sulphuric acid solution should be adjusted to that the amount of acid added to the mix is between 0.5% and 2% and desirably for most uses about 1% of the total solid material of the mix. A solution of 22° Bé. will provide acid and water in the proper ratio to give 3% water and 1% acid in the tempered mix.

After tempering, the mix is formed into the desired refractory bricks under a pressure exceeding 1000 pounds per square inch. In order to avoid subsequent shrinkage of the bricks during furnace use, it is necessary to obtain high density in the bricks as they come from the forming press. Preferably the press should be capable of exerting between 10,000 and 15,000 pounds per square inch on the bricks.

The pressed bricks may be dried in any suitable manner to develop the bond. In the case of bricks made from a mixture of chrome and magnesia, I will preferably cure the bricks at a temperature between 125° F. and the boiling point of water in an atmosphere as close to saturation as possible with moisture for a time of at least eight hours and preferably twelve hours. The cured bricks may then to advantage be dried at 250° F. to 300° F. in a normal atmosphere of low humidity for eighteen hours or longer.

The present invention is primarily useful in producing bricks which are capable of use in a furnace structure without kiln firing. The bricks of the present invention may, however, be fired in a ceramic kiln.

In the case of bricks which are to be used in unfired condition, any other suitable low temperature bond may be used instead of sulphuric acid. Sodium acid sulphate is suitable. Among the other suitable bonds are the organic bonds such as dextrine, asphalt, and sulphite paper waste. In case self-bonding magnesite is available, materials of the character of sulphuric acid or organic bonds may be omitted, but pyrophyllite and/or sericite with or without kaolin will, nevertheless, be employed.

The bricks produced in accordance with the present invention may be employed in any installation where high intermediate temperature crushing strength is desirable. They are particularly recommended for copper smelting and refining furnaces such as copper convertors, and for lead furnaces, glass tanks, glass furnaces, and other installations operating at temperatures between 700° C. and 1500° C., especially those operating around 1200° C. The bricks of the present invention are also useful in open hearth steel furnaces to avoid the presence of any zone of weakness between the hot face and the cold face at points which operate at temperatures of about 1200° C.

The bricks of the present invention may be used in furnace linings, roofs, walls, or other structures. In the case of roofs the invention may be applied to suspended roofs and to sprung arch roofs, with or without oxidizable metallic spacer plates.

The percentages herein referred to are percentages by weight based upon the dry magnesite, chrome, chrome magnesite, or magnesite chrome mix unless otherwise indicated by the context.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. The process of manufacturing non-acid refractory brick of increased intermediate temperature crushing strength, which comprises incorporating a member of the first group consisting of pyrophyllite, sericite, and mixtures of the two, into a brick mix predominantly composed of a non-acid refractory of the second group consisting of calcined magnesia, chromite, and mixtures of the two, prior to molding of the brick.

2. The process of manufacturing non-acid refractory brick of increased intermediate temperature crushing strength, which comprises incorporating a member of the first group consisting of pyrophyllite, sericite, and mixtures of the two, with kaolin into a brick mix predominantly composed of a non-acid refractory of the second group consisting of calcined magnesia, chromite, and mixtures of the two, prior to molding of the brick.

3. The process of manufacturing non-acid refractory brick of increased intermediate temperature crushing strength, which comprises incorporating from 1 to 10%, on the dry weight of the non-acid refractory material, of a member of the first group consisting of pyrophyllite, sericite, and mixtures of the two, into a brick mix predominantly composed of a non-acid refractory of the second group consisting of calcined magnesia, chromite, and mixtures of the two, prior to molding of the brick.

4. The process of manufacturing non-acid refractory brick of increased intermediate temperature crushing strength, which comprises incorporating from 1 to 10% of a member of the first group consisting of pyrophyllite, sericite, and mixtures of the two, with from 1 to 5% of kaolin, into a brick mix predominantly composed of a non-acid refractory of the second group consisting of calcined magnesia, chromite, and mixtures of the two, prior to the molding of the brick, the percentages being calculated on the dry weight of the non-acid refractory material.

5. The process of manufacturing non-acid refractory brick of increased intermediate temperature crushing strength, which comprises incorporating about 5% of a member of the first group consisting of pyrophyllite, sericite, and mixtures of the two, with about 3% of kaolin, into a brick mix predominantly composed of a non-acid refractory of the second group consisting of calcined magnesia, chromite, and mixtures of the two, prior to molding into brick, the percentages being calculated on the dry weight of the non-acid refractory material.

6. The process of improving the intermediate temperature crushing strength of bricks predominantly composed of a member of the group consisting of calcined magnesia, chromite, and mixtures of the two, which comprises introducing pyrophyllite into said brick mix prior to molding.

7. The process of improving the intermediate temperature crushing strength of bricks predominantly composed of a member of the group consisting of calcined magnesia, chromite, and mixtures of the two, which comprises introducing sericite into said brick mix prior to molding.

8. The process of improving the intermediate temperature crushing strength of bricks predominantly composed of a member of the group consisting of calcined magnesia, chromite, and mixtures of the two, which comprises introducing from 1 to 10% pyrophyllite into said brick mix prior to molding of the brick, the percentage being calculated on the dry weight of the non-acid refractory material.

9. The process of improving the intermediate temperature crushing strength of bricks predominantly composed of a member of the group consisting of calcined magnesia, chromite, and mixtures of the two, which comprises introducing from 1 to 10% of sericite into said brick mix prior to molding of the brick, the percentage being calculated on the dry weight of the non-acid refractory material.

10. The process of improving the intermediate temperature crushing strength of bricks predominantly composed of a member of the group consisting of calcined magnesia, chromite, and mixtures of the two, which comprises introducing pyrophyllite and kaolin into said brick mix prior to molding of the brick.

11. The process of improving the intermediate temperature crushing strength of bricks predominantly composed of a member of the group consisting of calcined magnesia, chromite, and mixtures of the two, which comprises introducing sericite and kaolin into said brick mix prior to molding of the brick.

12. The process of improving the intermediate temperature crushing strength of bricks predominantly composed of a member of the group consisting of calcined magnesia, chromite, and mixtures of the two, which comprises introducing from 1 to 10% of pyrophyllite and from 1 to 5% of kaolin into said brick mix prior to molding, the percentages being calculated on the dry weight of the non-acid refractory material.

13. The process of improving the intermediate temperature crushing strength of bricks predominantly composed of a member of the group consisting of calcined magnesia, chromite, and mixtures of the two, which comprises introducing from 1 to 10% of sericite and from 1 to 5% of kaolin into said brick mix prior to molding, the percentages being calculated on the dry weight of the non-acid refractory material.

14. The process of manufacturing refractory brick composed predominantly of a member of the group consisting of dead burned magnesia, chromite, and mixtures of the two, which comprises making up a mix of said refractory particles, incorporating from 1 to 10% of commercial pyrophyllite on the dry weight of the refractory particles and from 0.5 to 2% of sulphuric acid on the dry weight of the refractory particles, adding water, pressing the mix into brick under a pressure exceeding 1000 pounds per square inch and drying the brick to develop the bond.

15. The process of manufacturing refractory brick composed predominantly of a member of the group consisting of dead burned magnesia, chromite, and mixtures of the two, which comprises making up a mix of said refractory particles, incorporating from 1 to 10% of commercial pyrophyllite and from 1 to 5% of kaolin on the dry weight of the refractory particles, adding water, pressing the mixture into brick under a pressure exceeding 1000 pounds per square inch and drying the brick to develop the bond.

16. A refractory brick composed principally of a member of the first group consisting of calcined magnesia, chromite and mixtures of the two, and comprising a member of the second group consisting of sericite and pyrophyllite, and mixtures of the two.

17. A refractory brick composed principally of a member of the first group consisting of calcined magnesia, chromite, and mixtures of the two, and comprising from 1 to 10% of a member of the second group consisting of pyrophyllite, sericite, and mixtures of the two, the percentage being calculated on the dry weight of the member of the first group.

18. A refractory brick composed principally of a member of the first group consisting of calcined magnesia, chromite, and mixtures of the two, and comprising kaolin and a member of the second group consisting of pyrophyllite, sericite, and mixtures of the two.

19. A refractory brick composed principally of a member of the first group consisting of calcined magnesia, chromite, and mixtures of the two, and comprising from 1 to 10% of a member of the second group consisting of pyrophyllite, sericite, and mixtures of the two, with from 1 to 5% kaolin, the percentages being calculated on the dry weight of the member of the first group.

20. A refractory brick composed principally of a member of the first group consisting of calcined magnesia, chromite, and mixtures of the two, and comprising about 5% of a member of the second group consisting of pyrophyllite, sericite, and mixtures of the two, with about 3% of kaolin, the percentages being calculated on the dry weight of the member of the first group.

21. A refractory brick predominantly composed of a mixture of calcined magnesia and chromite in any proportions and comprising from 1 to 10% of commercial pyrophyllite, the percentage being calculated on the dry weight of the magnesia plus chromite.

22. A refractory brick predominantly composed of a mixture of calcined magnesia and chromite in any proportions and comprising from 1 to 10% of commercial pyrophyllite, and from 1 to 5% of kaolin, the percentages being calculated on the dry weight of the magnesia plus chromite.

23. A refractory brick composed principally of a member of the group consisting of calcined magnesia, chromite, and mixtures of the two, and suitable for use in a furnace without kiln firing, comprising a matrix of refractory particles, commercial pyrophyllite in an amount between 1 and 10% on the dry weight of the member of the group, and sulphuric acid in an amount between 0.5 and 2% on the total solids.

24. A refractory brick composed principally of a member of the group consisting of calcined magnesia, chromite, and mixtures of the two, and suitable for use in a furnace without kiln firing, comprising a matrix of refractory particles, commercial pyrophyllite in an amount between 1 and 10% and kaolin in amount between 1 and 5%, the percentages being calculated on the dry weight of the member of the group.

RUSSELL PEARCE HEUER.